United States Patent
Zhou et al.

(10) Patent No.: US 11,546,931 B2
(45) Date of Patent: **\*Jan. 3, 2023**

(54) SYSTEMS AND METHODS FOR UL SCHEDULER OPTIMIZATION WITH A SELF-ADJUSTMENT BSPR SCHEME

(71) Applicant: HEWLETT PACKARD ENTERPRISE DEVELOPMENT LP, Houston, TX (US)

(72) Inventors: Qiang Zhou, Santa Clara, CA (US); Nitin A. Changlani, Santa Clara, CA (US); Sachin Ganu, Santa Clara, CA (US); Hao Lu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/127,774

(22) Filed: Dec. 18, 2020

(65) Prior Publication Data

US 2022/0201718 A1 Jun. 23, 2022

(51) Int. Cl.
| | | |
|---|---|---|
| H04W 74/00 | (2009.01) | |
| H04W 72/12 | (2009.01) | |
| H04W 24/10 | (2009.01) | |
| H04W 84/12 | (2009.01) | |

(52) U.S. Cl.
CPC ....... *H04W 72/1268* (2013.01); *H04W 24/10* (2013.01); *H04W 84/12* (2013.01)

(58) Field of Classification Search
CPC .......... H04W 72/1242; H04W 72/121; H04W 28/0278
See application file for complete search history.

(56) References Cited

U.S. PATENT DOCUMENTS

| | | | |
|---|---|---|---|
| 9,756,523 B2 | 9/2017 | Zhang et al. | |
| 10,849,157 B1* | 11/2020 | Gopalakrishnan .. | H04W 74/006 |
| 2017/0230860 A1 | 8/2017 | Li et al. | |
| 2017/0332385 A1 | 11/2017 | Shirali et al. | |
| 2018/0255570 A1* | 9/2018 | Patil ................... | H04W 74/006 |
| 2020/0267595 A1 | 8/2020 | Tesanovic et al. | |

OTHER PUBLICATIONS

Duan, X. et al., An Improved Approach of Sending BSR and SR Based on MAC Layer in LTE System, (Research Paper), International Conference on Business Computing and Global Informatization, Jul. 29, 2011, pp. 520-523.

* cited by examiner

*Primary Examiner* — Zhiren Qin
(74) *Attorney, Agent, or Firm* — Sheppard Mullin Richter & Hampton LLP

(57) ABSTRACT

Systems and methods are provided for transmitting buffer state report poll (BSRP) triggers from a WLAN device with a BSRP frequency that is based on an amount of pending data at the UL buffer of each station associated to the WLAN device. The BSRP frequency can further be based on a priority of the pending data at the UL buffer. The amount of pending data at the UL buffer can be compared to a threshold, the value of which can depend on the priority of the pending data, and the BSRP frequency can be based on the comparison.

20 Claims, 7 Drawing Sheets

SYSTEMS AND METHODS FOR UL SCHEDULER OPTIMIZATION WITH A SELF-ADJUSTMENT BSPR SCHEME

DESCRIPTION OF RELATED ART

In recent years, Wireless Local Area Network (WLAN) technologies have emerged as a fast-growing market. One example of the various WLAN technologies is the Institute of Electrical and Electronics Engineers (IEEE) 802.11 standard. Client devices or stations (STAB) within WLANs communicate with access points (APs) to obtain access to one or more network resources. APs can refer to digital devices that may be communicatively coupled to one or more networks (e.g., Internet, an intranet, etc.). APs may be directly connected to the one or more networks or connected via a controller. An AP, as referred to herein, may include a wireless access point (WAP) that communicates wirelessly with devices using Wi-Fi, Bluetooth or related standards and that communicates with a wired network.

APs configure various parameters for communicating with other devices, and for supporting real time services while meeting Quality of Service (QoS) requirements. The specific values configured for various parameters determine the performance of an AP such as speed and reliability.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
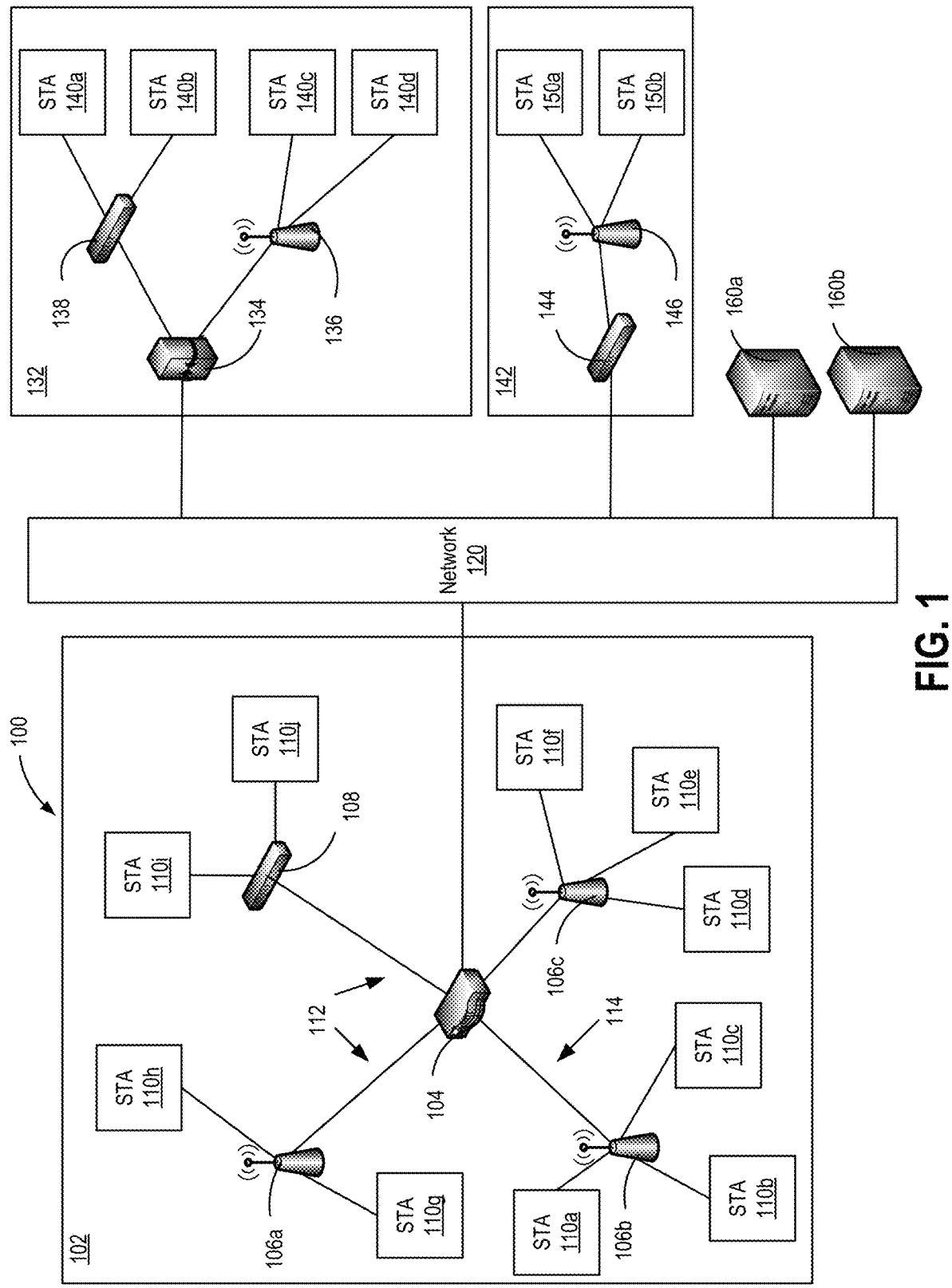
FIG. 1 illustrates an example wireless network deployment in which the uplink (UL) scheduler is optimized with self-adjustment buffer status report poll (BSRP) scheme in accordance with various embodiments.

The figures are not exhaustive and do not limit the present disclosure to the precise form disclosed.

DETAILED DESCRIPTION

Prior to the 802.11ax standard, AP was not able to guarantee a service level agreement (SLA) of bi-directional traffic due to a lack of a means to schedule UL transmission of designated STAs. To give the AP more control over UL traffic, high efficiency (HE) schemes, such as multi-user (MU) uplink (UL) schemes were introduced with 802.11ax wherein the channel is accessed simultaneously (i.e. at or around the same time, such as by full or partial bandwidth Multi-User Multiple Input Multiple Output (MU-MIMO), MU-Orthogonal Frequency Division Multiple Access (OFDMA), or a hybrid combination thereof).

To assist the AP in scheduling UL transmission and allocating UL Multi-User (MU) resources, APs can request STA buffer status information by generating and transmitting trigger frames, for example, buffer status report poll (BSRP) trigger frames (generally BSRP trigger or BSRP herein). It should be understood that a BSRP trigger frame can refer to a type of trigger frame which solicits one or more HE trigger-based (TB) physical layer (PHY) protocol data unit (PPDU) transmissions.

Each STA will explicitly deliver buffer status reports (BSRs) in response to a BSRP trigger frame. The BSR can contain scheduling information, such as information about how much data is in the STA buffer (i.e. data to be sent out). Thus, the BSRs can contain buffer status information. The BSR can be included in any frame sent to the AP. That is, a BSR can be carried in the QoS Control field and/or in the BSR variant of the HT-Control field of the 802.11 MAC header for one or more packet being transmitted from the STAs. The BSR can also be included in a quality of service (QoS) Null frame, an 802.11 QoS data frame that does not contain any data. In the pre-802.11ax world, an important use of the QoS Null frame was to carry the current power-save state of a non-AP STA. However, the 802.11ax specification has since enhanced QoS Null and QoS data frames to carry uplink (UL) scheduling information in the QoS control field and the high efficiency (HE) variant of high throughput (HT) control field of the media access control (MAC) header.

In particular, the QoS control field indicates the data buffered for a specific traffic identifier (TID) at a transmitting STA. That is, a QoS control field may be made up of five subfields, including TID information, end of service period (EOSP) information, acknowledgement (ACK) policy information, transmission opportunity (TXOP) limit or UL queue size information and A-MSDU present. The HE variant of the HT control field which may be optionally present in QoS Data/QoS Null frame contains a STA's capability to perform UL multi-user (MU) transmissions or buffer status information used for UL MU operation, etc.

The 802.11ax protocol doesn't define the criteria for the AP to send the BSRP trigger frame. In some implementations, there can be a fixed interval (or fixed frequency) for sending BSRP triggers to all STAs to trigger solicited BSR. The fixed interval or frequency can be the same regardless of STA types, buffer status, and activities of the STAs. However, providing BSRP trigger frames at the same interval with all STAs can introduce some problems. First the BSR received from the STAs cannot reflect buffer state of the STAs with active and high priority UL traffic in-time. This can lead to a mis-behavior of the UL scheduler. Second, this can reduce the efficiency of both air resource (e.g. by increased overhead) and STA's power consumption by triggering frequent BSRP to clients with low priority and inactive UL traffic.

Accordingly, various embodiments are directed to dynamically adjusting an interval or frequency that BSRP triggers can be sent, and thus dynamically adjusting the request for UL scheduling information (e.g., buffered data, STA capability information) obtained by way of BSR frames (e.g. as part of QoS Null/QoS Data frames and MAC headers) transmitted by any STA. In embodiments, the BSRP trigger frame can be different and separate from other trigger frames sent by the AP. In embodiments, the BSRP can be combined or aggregated with other trigger frames sent by AP. Other trigger frames can be used to schedule STAs to transmit data. In embodiments, trigger frames which schedule data to be transmitted by one or more STAs can be based on the STA buffer status, and/or priority for traffic, all information which can be included as part of the BSR. There can be multiple formats of trigger frame and of BSRP Trigger frame ("trigger type"). This can allow for the AP to have a better estimate of respective buffer status of respective STAs (e.g. for efficiently scheduling high priority UL traffic), while reducing the overhead (e.g. in the DL and/or the UL by way of the BSRP trigger frames and/or the BSR). That overhead can be focused on high priority UL traffic, where receipt of BSRs would be useful for the AP efficiently scheduling UL traffic. This UL scheduling information can be used to improve network performance. That is, AP in the same extended service set (ESS) can receive and parse the information. For example, an AP may use such UL scheduling information (from STAs associated to co-channel APs in the same ESS) to minimize the latency for UL latency-sensitive traffic in that ESS. It should be understood that traffic such as voice and video (described below in the context of access categories (ACs)) can be deemed to be latency-sensitive, while best-effort and background traffic/traffic type ACs are not considered to be latency-sensitive. Thus, the aforementioned minimization of latency can be applied to UL latency-sensitive traffic such as voice or video traffic. Additionally, an AP may use such UL scheduling information to minimize contention amongst STAs connected to different APs on the same channel in the same ESS, thereby improving system capacity.

It is understood that the AP can capture and parse valid frames of interest to gain useful scheduling information. It should be understood that frames from the STA can be considered valid by an AP if it is transmitted by a STA and passes a cyclical redundancy check (CRC) check. Since the information of interest, namely QOS control fields and HE variant of the HT control fields, are part of the MAC header and hence unencrypted, the CRC validation can be deemed sufficient to trust the information contained in that frame.

The aforementioned BSR can be included in the following frames: single-user (SU) UL QoS Null frames, QoS Null frames received as part of UL-Orthogonal Frequency Division Multiple Access (OFDMA) transmissions, Basic Trigger frames and subsequent QoS Data or QoS Null frames received as part of UL-OFDMA transmissions, and UL SU QoS Data frames. These OBSS frames may be transmitted by STAs associated to an AP or by STAs associated to one or more other APs belonging to the same ESS (i.e., can be part of co-channel OBSS in the ESS).

It should be noted that according to the 802.11 standard, a service set or ESS can refer to a group of wireless network devices that are identified by the same service set identifier (SSID) or "network name." An ESS or service set forms a logical network operating with the same level 2 networking parameters, i.e., they are on the same logical network segment, e.g., Internet Protocol (IP) subnet or virtual LAN (VLAN). On the other hand, a basic service set (BSS) can refer to a subgroup of devices with a service set that (in addition to operating on the same level 2 networking parameters to form a logical network) operate within the same physical layer medium access characteristics, e.g., RF, modulation scheme, security settings, etc. such that they are wirelessly networked. Thus, in an enterprise WLAN network, multiple BSSs can be controlled such that network devices can be clustered in different BSS networks.

It should also be noted that the 802.11ax specification introduces AP-initiated, trigger-based UL MU transmissions. In order to schedule UL transmissions, an AP may need information about the data buffered at a client or STA that is waiting to be transmitted. For example, an AP may transmit BSRP trigger frames to procure this information by allocating resources units (RUs) for the UL response (i.e. the BSR). The STAs that are solicited by the AP will respond to the BSRP trigger frames with QoS Null frames (or other frames) carrying the BSR in the suggested RUs. The STAs may also send unsolicited BSRs in QOS Null or QOS Data frames. These QoS Null frames may be part of SU or MU transmissions. While these frames from a STA are received for parsing at the AP to which the STA is associated, the QoS Null frames, as alluded to above, may also be "overheard" by some neighboring co-channel APs.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices/STAs 110a-j. Using a connection to a switch 108 or AP 106a-c, a STA 110*a-j* may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired STA 110*i-j*. STAs 110*i-j* may connect to the switch 108 and through the switch 108, may be able to access other devices within the network configuration 100. STAs 110*i-j* may also be able to access the network 120, through the switch 108. The STAs 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in primary site 102 for STAs 110*a-h*. Each of APs 106*a-c* may be a combination of hardware, software, and/or firmware that is configured to provide wireless network connectivity to wireless STAs 110*a-h*. In the illustrated example, APs 106*a-c* can be managed and configured by the controller 104. APs 106*a-c* communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

It should be noted that APs, such as AP 130, AP 132, and AP 134 are enabled to implement VAPs, namely, support for one or more multiple distinct SSID values over a single AP radio with unique media access control (MAC) addresses per SSID (i.e., BSSID). As is known, an SSID is a field between 0 and 32 octets that may be included as an Information Element (IE) within management frames. In the context of the 802.11 standard, management frames supporting the SSID IE include the beacon, probe request/response, and association/reassociation request frames. In one embodiment, an AP supports VAPs using multiple BSSIDs. Each beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. In one embodiment, an AP may advertise up to a given number (e.g., 16) of beacons, each with a different BSSID to provide the VAP support. Each VAP may have a unique MAC address, and each beacon may have a network name.

It should be understood that wireless communications as contemplated herein may involve the configuration of one or more parameters which determine a QoS for communication by or with WLAN devices, such as, e.g., APs. Parameter values determine how frequently WLAN devices request access to a radio frequency channel and/or use a radio frequency channel. Parameter values for a particular WLAN device that result in a radio frequency channel (or an overlapping portion of two radio frequency channels) being accessed more often by that particular WLAN device relative to other WLAN devices may be referred to herein as aggressive parameter values. In addition, parameter values that are more aggressive relative to default or industry-standard parameter values for obtaining channel access may also be referred to herein as aggressive parameter values. Examples of parameters are Enhanced Distributed Channel Access (EDCA) parameters and Hybrid Coordination Function Controlled Channel Access (HCCA) parameters. MU EDCA parameters can include one or more of EDCA parameters mentioned herein, which can be tailored to MU channel access schemes.

EDCA parameters may include, but are not limited to the following:

a. Access Category (AC)—An AC parameter refers to one of a voice (VO) AC, a video (VI) AC, a best effort (BE) AC, and a background (BK) AC. There may be more ACs as described in the 802.11 standard, and each AC may be associated with a different priority level.

b. Arbitration Inter-Frame Spacing (AIFS)—A time interval between frames being transmitted under the IEEE 802.11 standard.

c. Minimum Contention Window (CWmin)—Input to an algorithm that determines the initial random backoff wait time for retrying a transmission in response to a failed attempt (for example, due to unavailability of an RF channel). The random backoff wait time may be increased when a frame transmission is unsuccessful due to the channel being unavailable for the transmission.

d. Maximum Contention Window (CWmax)—The maximum random backoff wait time.

f. Transmission Opportunity (TXOP) Limit—An interval of time when a STA has the right to initiate transmissions toward an AP and vice-versa, and send as many frames as possible. These frames can be SIFS separated and this exchange is referred to as a "burst".

In some embodiments, and as alluded to above, ACs are defined for classifying network traffic. Each AC (configured for an AP) is associated with a corresponding set of parameter values. The transmission of frames classified under a particular AC can be transmitted according to the set of parameter values corresponding to that particular AC. That is, ACs can be likened to queues that an AP can populate with data, and from which that data can be transmitted. Typically, there are four types of ACs (alluded to above, and described in greater detail below) that can be assigned to different types of applications, each having its own particular QoS requirements/parameters. Moreover, once an AC is assigned to an application type, the manner in which traffic/data is queued in an AC, along with the manner in which traffic/data is taken out of the queue can be configured. It should be understood that a particular AC can be associated with one or more queues/sub-queues. Four example ACs include background (BK), best effort (BE), video (VI), and voice (VO), with VI and VO typically associated with low latency, or higher priority than BK and BE.

Figure 2A:
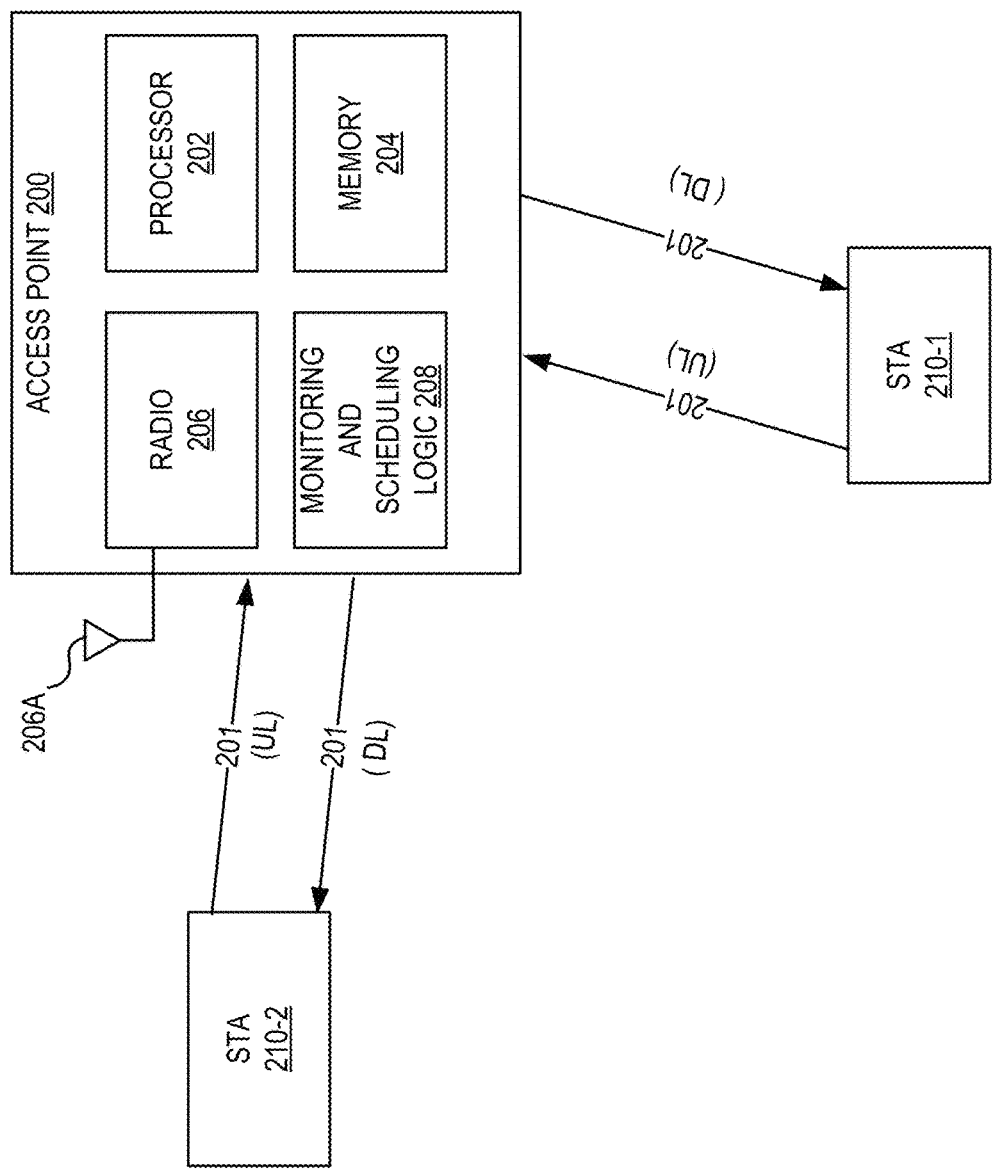
FIG. 2A illustrates an example access point (AP) in accordance with various embodiments, in which the UL scheduler is optimized with self-adjustment BSRP scheme in accordance with various embodiments.

FIG. 2A shows a schematic representation of an example AP 200 in accordance with one embodiment. AP 200 may be a network device that can include, e.g., one or more of: a processor 202, memory/data storage 204, a radio 206 (and corresponding antenna 206A), and monitoring and scheduling logic 208.

Memory 204 may include a fast read-write memory for storing programs and data during the AP 200's operations and a hierarchy of persistent memory such as ROM, EPROM, and Flash memory for storing instructions and data needed for the startup and/or operations of AP 200. Memory 204 may store data that is to be transmitted from AP 200 or data that is received by AP 200. Memory 204 may store one or more of the various parameters (and values thereof) described herein. In some embodiments, memory 204 is a distributed set of data storage components. Although not shown, it should be understood that AP 200 may further include input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces.

Processor 202 is coupled to at least memory 204. Processor 202 may be any processing device including, but not limited to a MIPS-class processor, a microprocessor, a digital signal processor, an application specific integrated circuit, a microcontroller, a state machine, or any type of programmable logic array.

Radio 206 may be a 5 GHZ radio, a 2.4 GHZ radio, a 6 GHz radio, or other appropriate wireless communications component for effectuating wireless communications. Since the 802.11ax enhancements are exploited, embodiments described herein may be better suited for 802.11ax deployments or APs with 802.11ax radios, especially in the Wi-Fi 6/6 GHz context. Radio 206 may be configured to both transmit and receive data. Radio 206 may be dedicated to a communication channel 201. In some examples, communication channel 201 operates on a communication band (e.g., 5.0 GHz UNII band) and operates in accordance with a particular wireless specification (e.g., 802.11ax). For example, by operating in accordance with the particular specification, such as IEEE 802.11ax, communication channel 201 can employ OFDMA, spatial reuse, MU-MIMO, and/or combinations thereof. By extension, a wireless client device/STA having a capacity of complying with the particular wireless specification can, in such examples, have the capacity for employing OFDMA, spatial reuse, UL MU-MIMO, and/or combinations thereof. It should be understood that AP 200 may have a plurality of radios (physical and/or logical), and may have dedicated or shared channels for each radio or group(s) of radios.

In some embodiments, monitoring and scheduling logic 208 may include one or more functional units implemented using firmware, hardware, software, or a combination thereof for configuring parameters associated with AP 200 and/or STA 210-1 for the transmission of data/frames to and from AP 200. Although monitoring and scheduling logic 208 is shown as being implemented on AP 200, one or more physical or functional components of the monitoring scheduling logic 208 may be implemented on a separate device, such as an AP controller, an example of which may be controller 104 of FIG. 1A. Monitoring and scheduling logic 208 can include one or more functional units implemented using firmware, hardware, software, or a combination thereof for monitoring one or more received data/frames, and scheduling one or more data/frames to be transmitted to and/or from AP 200. As such, monitoring and scheduling logic can include a traffic monitor, UL scheduler and/or DL scheduler, each of which may be implemented with the aforementioned functional units.

In various embodiments, monitoring and scheduling logic 208 can include prioritization logic. Various embodiments can prioritize those frames being sent in the UL and/or DL direction. In embodiments, frames can be prioritized by adjusting values for one or more parameters as described herein, such as MU EDCA parameters and/or EDCA parameters, for example by adjusting AC. For example, all UL traffic flows associated with a QoS-sensitive application flow can be identified (e.g. by monitoring logic). The appropriate AC associated with the identified UL traffic flows can be determined. In some embodiments, the selected AC can be higher priority than that of the UL traffic flows. In some embodiments, the priority of all traffic flows can be defined. In some embodiments, the monitoring and scheduling logic 208 can schedule one or more data or frames from a specific STA, for example, by generating one or more trigger frames. In some embodiments, the monitoring and scheduling logic 208 can schedule one or more data or frames from a specific STA based on the highest priority traffic flow for that specific STA. Thus, various embodiments can prioritize one or more frames in an application flow.

In embodiments, if the STA x has y UL traffic flows, then the priority for the STA x can be the maximum priority of the y traffic flows. In embodiments, when the DL traffic for a bi-directional flow is prioritized, the AP can prioritize UL traffic from the STA for the same flow. For example, if the DL traffic to a specific STA for a bi-directional flow is prioritized by the AP, the UL traffic from that specific STA can be prioritized (i.e. by being assigned a high priority). The destination STAs for the DL traffic of the prioritized bidirectional flows can be given a higher priority when being scheduled for UL transmissions. This can ensure that the flows obtain better channel access than all the other traffic for other STAs in the wireless network.

Various embodiments can schedule those frames being sent in the UL and/or DL direction. Monitoring and scheduling logic 208 can generate one or more trigger frames to be sent by the AP 200. Trigger frames can include BSRP trigger frames, but also other, separate trigger frames configured for scheduling traffic (e.g. in the UL). Various embodiments can schedule those frames being sent in the UL and/or DL direction, based on one or more information in BSR received from STAs. Various embodiments can schedule those frames being sent in the UL and/or DL direction, based on, for example, information received from prior frames received from the STAs. Various embodiments can dynamically schedule those frame being sent from the client device/STA 210-1 and/or client device/STA 210-2, for example, by adjusting one or more resource units (RUs), and/or by dynamically adjusting one or more parameters discussed herein (such as MU EDCA and/or EDCA parameters). Various embodiments can dynamically adjust those frames (e.g. frames which include data or traffic, but also frames which include BSR) being sent from the client device/STA 210-1 and/or client device/STA 210-2.

As illustrated in FIG. 2A, AP 200 may be receiving frames from STA 210-1, STA-2, (and/or other STAs, not shown) over communications channel 201 in the UL direction while transmitting frames to client device/STA 210-1, client device/STA 210-2 (and other STAs, not shown), in the DL direction. As will be discussed in greater detail below, one embodiment dynamically adjusts the BSRP trigger interval or BSRP trigger frequency for sending BSRP trigger to WLAN devices (e.g. STA 210-1, STA 210-2, or another WLAN device not shown). The logic for dynamically adjusting the BSRP trigger interval or BSRP trigger frequency can be included in monitoring and scheduling logic 208.

It is understood that monitoring and scheduling logic 208 (e.g. by DL scheduler) can schedule BSRP triggers to be transmitted according to specific BSRP trigger interval or BSRP trigger frequency. It is understood that the BSRP trigger interval can relate to BSRP trigger frequency, in that the BSRP trigger frequency can correspond to a number of BSRP triggers scheduled to be transmitted or transmitted within a fined period which can correspond to the BSRP trigger interval. Scheduler can start a timer corresponding to the BSRP trigger interval. The timer can start or reset at transmission or generation of a BSRP trigger. The timer can reset to a value corresponding to a BSRP trigger interval as updated at the scheduler. The BSRP trigger interval can be a beacon interval or other, e.g., user/system-defined interval. The BSRP trigger interval can have a default value corresponding to a beacon interval or other, e.g. user/system-defined interval. Various embodiments described herein are able to effectuate dynamic adjustment of the BSRP trigger interval or BSRP trigger frequency. One of ordinary skill in the art would understand how BSRP trigger frequency can be modified in line with modifications to BSRP interval (and vice versa).

In some embodiments, certain network characteristics may be leveraged, including the following:

It can be understood that various embodiments are implementable on any AP platform with real-time benefits. At any instance, an AP can ascertain the amount of queued UL traffic by processing BSR information (e.g. in received QoS frames). At any instance, the AP can ascertain an amount of queued UL traffic of a specific TID/AC at a STA.

802.11ax-compliant STAs are capable of UL MU transmissions. Hence, UL data may make its way to an AP either via SU or MU transmissions. There is a category of STAs that do not support UL MU data transmission, and hence such STAs may resort to UL SU transmissions only. Those STAs that do support UL MU transmissions may get scheduled by an AP in the UL direction as part of trigger-based MU transmissions. Accordingly, such STAs may not need a medium/channel access opportunity to transmit their queued data for UL transmission.

It should be understood that each AP, e.g. by UL scheduler can schedule one or more STAs to transmit in the UL (e.g. by MU means). Each AP can advertise MU EDCA parameters and SU EDCA parameters to be used by STAs for UL, for example by transmitting one or more beacons or trigger frames. The STAs evaluated in schemes discussed herein are not restricted to the AP BSS. Various embodiments are directed to leveraging BSR information from STA that the AP can hear.

It can be understood that various embodiments are able to effectuate dynamic adjustment of BSRP trigger intervals or BSRP trigger frequency under a variety of scenarios. For example, in some communication scenarios, there can be numerous STA devices attempting to access the channel 201, (not shown), whereas in others, there can be a smaller number. In some communication scenarios, for example, there can be mixed clients (i.e. employing a variety of channel access schemes, such as high efficiency or MU schemes, or SU schemes).

It can be understood that the dynamic adjustment of BSRP trigger intervals or BSRP trigger frequency as disclosed herein need not be limited for use with APs/AP controllers, but may be used with non-AP devices that, e.g., operate in peer-to-peer or mesh network topologies. Hence, various embodiments disclosed and/or contemplated herein can be used to enhance the conventional channel access (i.e. wired and/or wireless), in two (UL and DL) directions relative to a given device (i.e. not necessarily a WLAN device). The dynamic adjustment of BSRP trigger intervals or BSRP trigger frequency can also be applied or leveraged on a per-application basis. That is, if a network, e.g., network 100 (FIG. 1A) or some portion(s) thereof become overloaded, certain applications may be afforded a higher priority than others.

As used herein, the term "traffic flow" can refer to a stream of data packets, e.g., segments, frames, or datagrams, that share the same channel. As used herein, the term "traffic flow" can refer to stream of data packets, e.g. segments, frames, or datagrams that same 5-tuple. It should be understood that the aforementioned 5-tuple can refer to a set of five different values that comprise a TCP/IP connection, and includes: source IP address; a destination IP address; a source port address; a destination port address; and the protocol in use (TCP/UDP).

The manner in which data is characterized may be specified, e.g., by a developer or other entity, such that deep packet inspection (described below) can be used to identify and classify this data traffic so that it can be assigned to an appropriate AC, (or other EDCA or MU EDCA parameter) and ultimately, as disclosed herein, prioritized.

It should be noted that deep packet inspection can be performed on traffic flows to determine whether the segments/datagrams for a particular traffic should correspond to an advertised priority. Moreover, deep packet inspection can be performed as part of one or more negotiation between the AP and client devices. Accordingly, the segments/datagrams for a particular traffic need not necessarily correspond to the advertised priority (e.g. as advertised by the STAs).

Figure 2B:
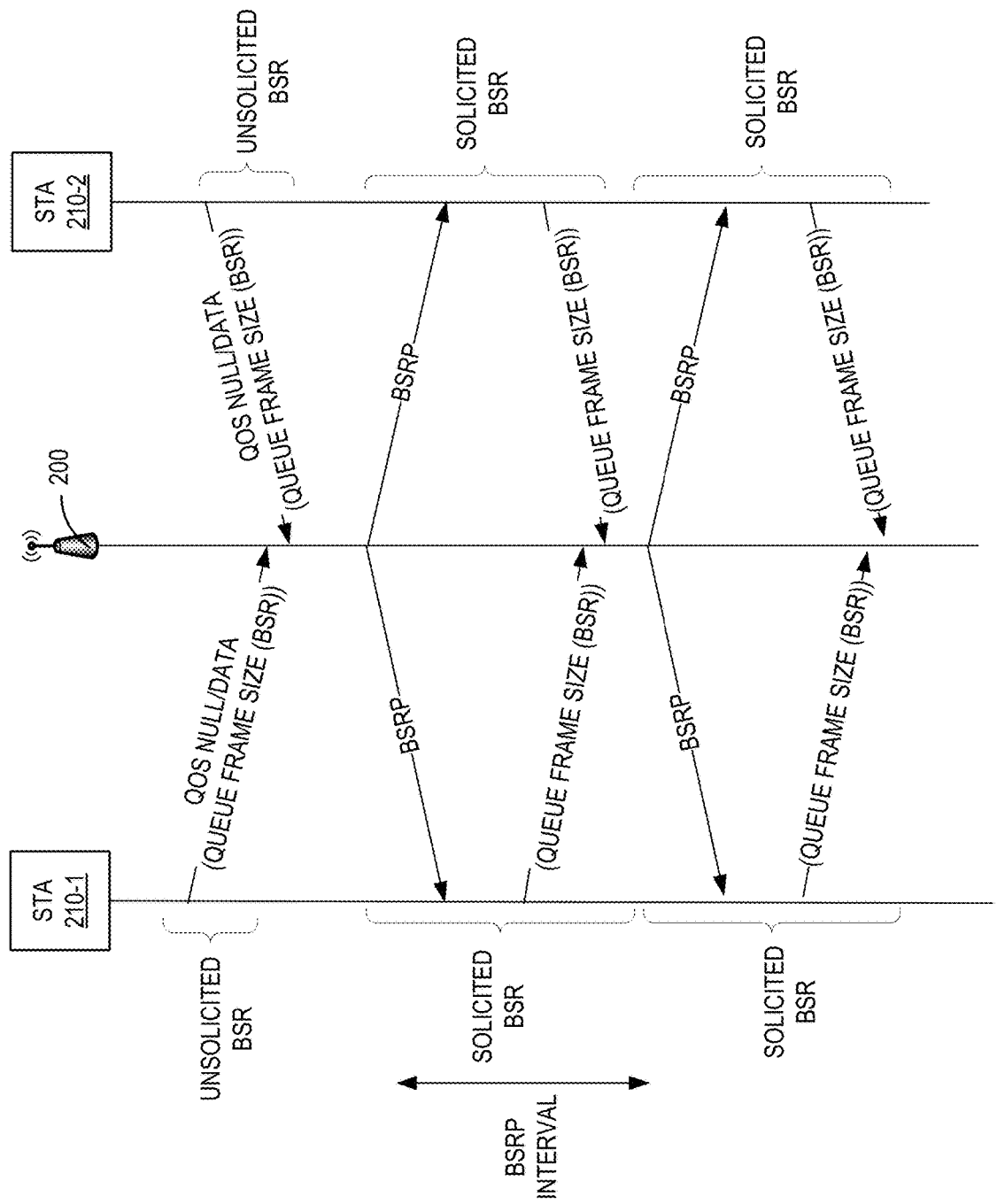
FIG. 2B illustrates an example message flow that includes unsolicited buffer status report (BSR) and BSR solicited by BSRP frames in accordance with various embodiments.

FIG. 2B illustrates an example message flow that includes unsolicited BSR (e.g. QoS null data, or as part of MAC header) and solicited BSR (e.g. solicited by BSRP trigger frames). As illustrated in FIG. 2B, an AP, i.e., AP 200, may be associated with one or more STAs, (e.g. 2010-1 and 210-2-illustrated). Thus, AP 200 may receive and parse BSR data frames (e.g. as part of MAC header or QoS Null/Data frames) from the one or more STAs (e.g. 206a-1). The BSR data frames can include frame size for the queue at the UL buffer of each STA. Accordingly, AP 200 may become aware of the UL scheduling information (the UL buffered data for transmission) contained in those BSR frames (e.g. QoS Null/Data frames).

For example, STA 210-1 may transmit unsolicited BSRs vis-à-vis QoS Null/Data frames to AP 200. In the case of solicited BSRs, AP 200a may transmit a BSRP (i.e., a trigger frame indicating a request for BSR information) to STA 210-1. STA 210-1 may then respond to AP 200 by transmitting a QoS Null frame that includes BSR information, e.g., its queue frame size, to AP 206a in order to allow AP 206a to schedule UL traffic. It should be noted that AP 200 will allocate RUs upon transmitting the BSRP, and STA 210-1 will transmit the BSR information (e.g. as part of QoS Null frame(s) carrying the BSR information) in the allocated RUs. Likewise, other STAs (e.g. STA 210-2) associated to the AP may transmit unsolicited BSRs vis-à-vis QoS Null/Data frames to AP 200. Additionally, AP 200 may transmit a BSRP to other STAs (e.g. STA 210-2) (in a solicited scenario, those other STAs may then respond to AP 200 by transmitting BSR information (e.g. as part of a QoS Null frame), e.g., its queue frame size, to AP 200 in order to allow the AP 200 to schedule UL traffic.)

The BSRP interval or BSRP frequency can correspond to the time between subsequent BSRP triggers. In embodiments described herein, the BSRP interval or BSRP frequency can be dynamically adjusted, including based on the buffer status of each STA. In embodiments, the BSRP frequency can be based on how many bytes are in the buffer as advertised by each STA (i.e. the size of reported frames) less the bytes that were sent by the client (before the next BSRP trigger). For example, the scheduler can be configured to extract the pending frames of each STA.

The bytes or frames sent by STAs can be determined by monitoring frames received at the AP, e.g. by monitoring and scheduling logic 208. The UL buffer status can also be determined by monitoring frames received at the AP. Pending bytes can be the bytes advertised in BSR (i.e. advertised as in the buffer), less the bytes sent by the STA by any means (e.g. SU and/or MU schemes). Pending bytes can be the bytes advertised in BSR (i.e. advertised as in the buffer), less the bytes sent by the STA by any means (e.g. SU and/or MU means) since receipt of the BSR. The determination of pending bytes can correspond to a determination of how many bytes are left in the buffer to be sent by each STA. In embodiments, UL scheduler can extract the pending frames of STA x at time t as Reported frames (x,t). At time t1 when the next BSRP generated or triggered, UL bytes sent by STA x via any means (SU/MU) can be recorded as Sent frames (x,t,t1). The scheduler can determine that Pending frames (x,t,t1)=Reported frames (x,t)−Sent frames(x,t,t1).

Figure 2C:
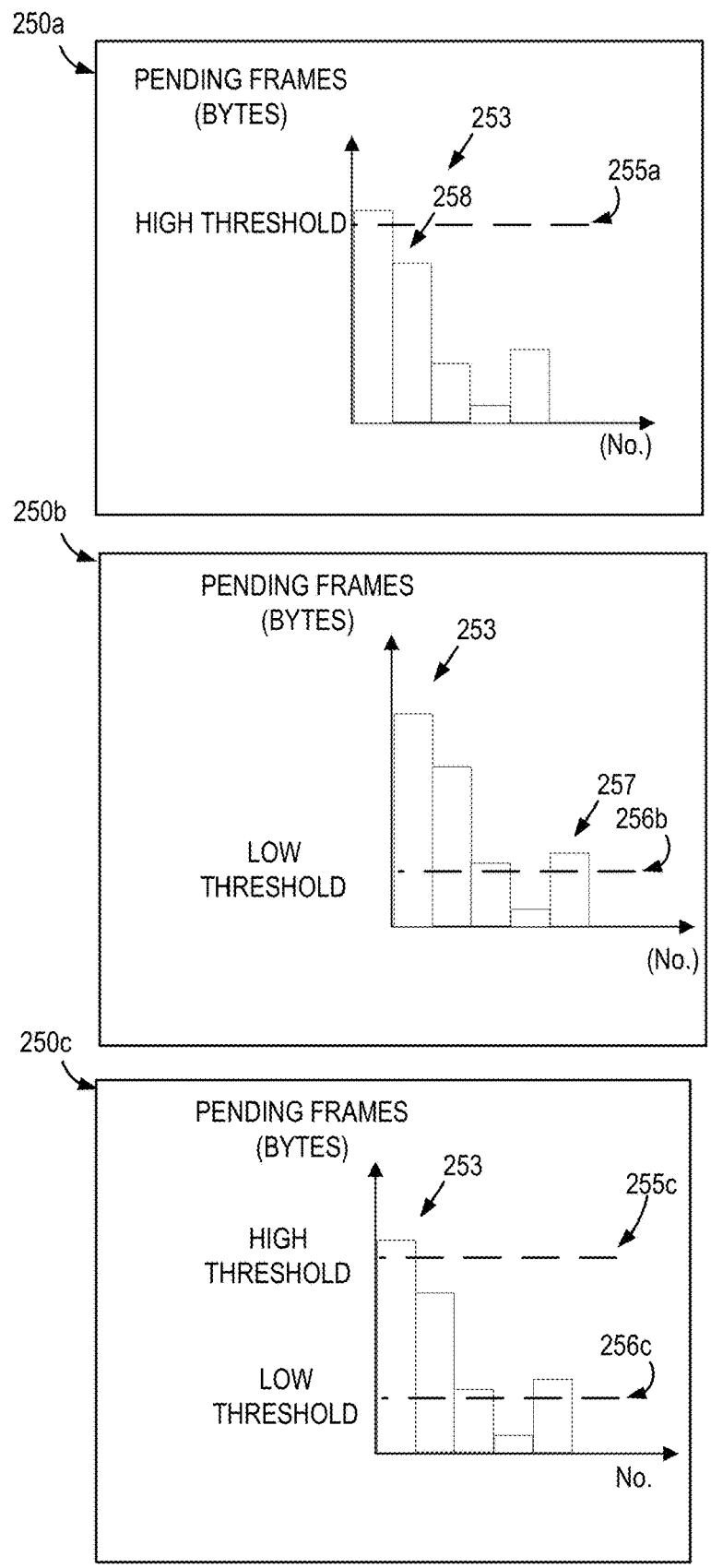
FIG. 2C illustrates example thresholds for pending frames for self-adjustment BSRP scheme in accordance with various embodiments.

FIG. 2C illustrates example thresholds for pending frames for self-adjustment BSRP scheme in accordance with various embodiments. Embodiments described herein can have one or more thresholds for comparing pending frames 253 (e.g. pending UL frames). FIG. 2C shows three graphs 250a, 250b, 250c of pending frames 253 in a time series and defined thresholds. The time series of pending frames 253 can be created based on pending frames each time they are determined or calculated. For example, pending frames can be determined or calculated each time new frames are received (e.g. data frames and/or frames comprising BSR information). The time series can be created at or between triggering of subsequent BSRP trigger frames, and/or at or between receipt of BSR information.

As will be explained in more detail, the thresholds can be dynamically adjusted, and can be based on a determined priority for traffic (e.g. traffic flow). The number of, type of and/or value of thresholds can be based on the service level agreement requirement, for different traffic type (e.g. Voice, Video, etc.). As such, there can be one or more thresholds utilized. A higher and a lower threshold will be referenced herein, however, it is understood that as valued for the higher and lower thresholds can be adjusted, the higher threshold need not necessarily be above the lower threshold. Similarly, a value for the lower threshold need not be lower than the higher threshold. The lower threshold can signify some type of adjustment to the BSRP frequency or BSRP interval if the pending byes (or frames) are at or below the lower threshold. The higher threshold can signify some type of adjustment to the BSRP frequency or BSRP interval if the pending byes (or frames) are at or higher than the higher threshold.

Graph 250a shows pending frames 253 and higher threshold 255a. Graph 250b shows pending frames 253 and lower threshold 256b. Graph 250c shows pending frames 253, higher threshold 255c, and lower threshold 256c.

The lower threshold and/or higher threshold can be defined and utilized (i.e. lower threshold 256b only as shown in graph 250b, higher threshold 255a only as shown in graph 250a, or both lower threshold 256c and higher threshold 255c shown in graph 250c). The thresholds, and where the pending bytes or frames are in relation to that threshold, can be used to update the scheduler to adjust (e.g. reduce, increase, or return to a default value) the BSRP frequency and/or BSRP interval.

In embodiments, values for the lower threshold can depend on a determined priority (e.g. for the frames and/or for the traffic flow). In embodiments, increasing a frequency of BSRP trigger frames, can allow for more opportunities for high priority (e.g. low latency) traffic to be transmitted. As such, a different lower threshold value could be defined for each priority. In other words, the value of the lower threshold can depend on the priority. The lower threshold can be used to update the scheduler to schedule (and thus trigger) a more frequent BSRP. For trigger BSRP, the lower threshold can have positive correlation with the priority of traffic from an STA. For the same traffic type (e.g. the same AC), an STA with higher priority for triggering BSRP can have a higher lower threshold than an STA with a lower priority for triggering BSRP As another example, if a first STA is of higher priority than a second STA, the lower threshold of the STA which is of higher priority, is higher than the lower threshold of the STA which is of a lower priority. Thus, if Priority of Client (x)≥Priority of Client (y), then Threshold$_{lower}$ of Client(x) Threshold$_{lower}$ of Client (y).

The higher threshold can have a positive correlation with STA priority. For the same traffic type (e.g. for the same TID or AC), an STA with higher priority for triggering BSRP can have a higher value for the higher threshold. Thus, if Priority of Client (x)≥Priority of Client (y), then Threshold$_{higher}$ of Client(x)≥Threshold$_{higher}$ of Client (y).

In embodiments, the pending bytes or frames can be compared to a lower threshold level. The BSRP frequency can increase (thus BSRP interval can decrease) if pending bytes are less than the lower threshold level. In some embodiments, a BSRP is immediately (or close to immediately) triggered (i.e. with a small BSRP interval) if the pending bytes are below a threshold.

In embodiments, the pending frames (or pending bytes) can be less than the lower threshold (256b, 256c shown) for example, when between two consecutive BSRP triggers, the STA sends more frames through SU transmissions (as compared to MU transmissions). In embodiments, the pending frames (or pending bytes) can be less than the lower threshold when the STA may not have been queued with more data while one or more frames have been sent—and as a result, the pending number of frames on the client can go down.

In embodiments, the BSRP frequency or BSRP interval can depend on a trendline or slope for the pending frames. For example, the BSRP frequency or BSRP interval can depend on if the size, or amount of pending frames is increasing or decreasing (i.e. in a time series of pending frames). For example, If Pending frames(x,t,t1) is increasing (i.e. a positive slope) and crossing the lower threshold in the upward direction (i.e. from below the lower threshold or at the threshold to at the lower threshold or above the lower threshold), the scheduler could choose either restore frequency of BSRP to default value or decrease the frequency of BSRP to a proper value. With reference to graph 250*b* shown in FIG. 2C, the pending frames 257 in the time series of pending frames 253, can meet the criteria of an amount of Pending frames(x,t,t1) increasing (i.e. a positive slope) and crossing the lower threshold 256*b* in the upward direction.

A higher threshold could be used to update the scheduler to schedule (and thus trigger) less frequent BSRP (i.e. for BSRP frequency to decrease). BSRP frequency can decrease if pending bytes are higher than a higher threshold. Thus, if Pending frames(x,t,t1) is larger than the high threshold, then scheduler could decrease the frequency of triggering BSRP. This could happen when between two consecutive BSRP occurrences, the STA did not send any or many frames through SU transmissions, or the STA may have been queued with more data than before—and as a result, the pending number of frames on the client goes up. If Pending frames(x,t,t1) is decreasing (e.g. with negative slope or decreasing trendline), and crossing the higher threshold in the downward direction, the scheduler could choose either to restore frequency of BSRP to a default value or increase the frequency of BSRP to a proper value. With reference to graph 250*a* shown in FIG. 2C, the pending frames 258 in the time series of pending frames 253, can meet the criteria of an amount of Pending frames(x,t,t1) decreasing (i.e. a negative slope) and crossing the higher threshold 255*a* in the downward direction.

Figure 3A:
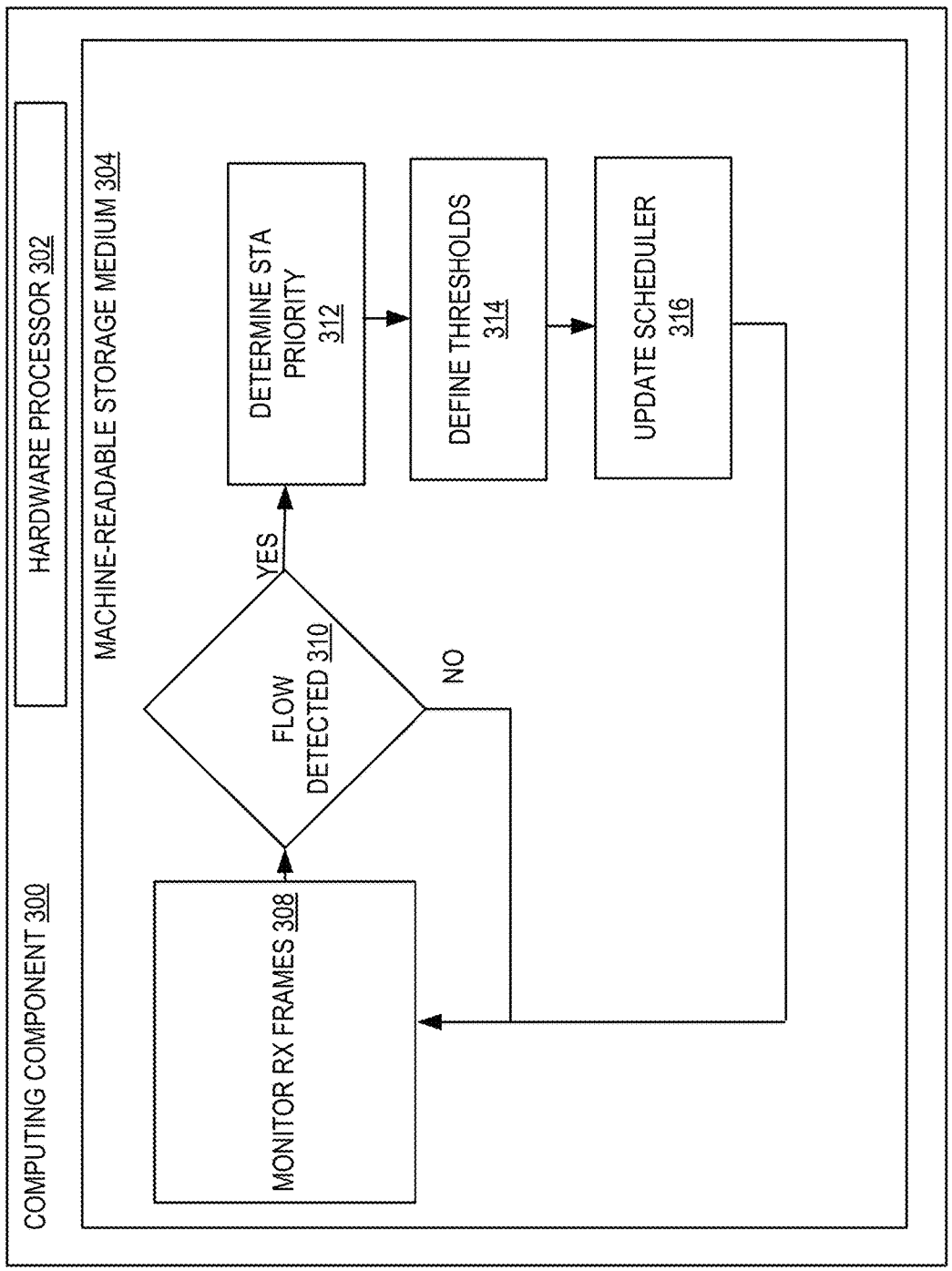
FIG. 3A illustrates an example computing component for optimizing the UL scheduler with self-adjustment BSRP scheme in accordance with various embodiments.
Figure 3B:
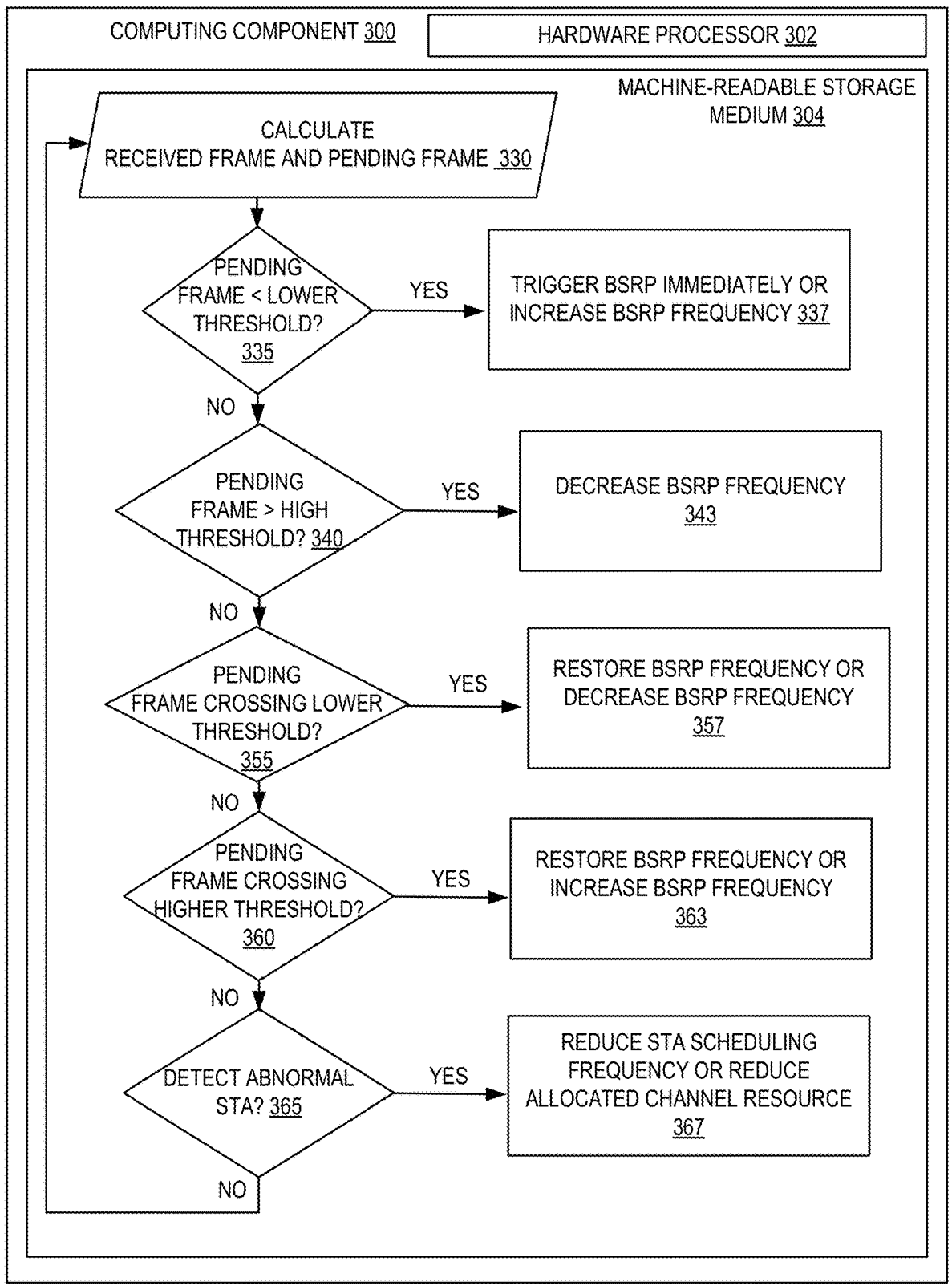
FIG. 3B illustrates an example computing component in which the UL scheduler is optimized with self-adjustment BSRP scheme in accordance with various embodiments.

FIG. 3A and FIG. 3B show block diagrams of an example computing component or device 300 for optimizing the UL scheduler with self-adjustment BSRP scheme in accordance with various embodiments.

Computing component 300 may be, for example, a server computer, a controller, or any other similar computing component capable of processing data. In the example implementation of FIG. 3A, computing component 300 includes a hardware processor, 302, and machine-readable storage medium, 304. In some embodiments, computing component 300 may be an embodiment of a controller, e.g., a controller such as controller 104 (FIG. 1), or another component of wireless network 100, e.g., an AP such as AP 106*a* (FIG. 1), for example.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-316, to control processes or operations for prioritizing bi-directional traffic flows. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-316 shown in FIG. 3A. Instructions 306-316 shown in FIG. 3A, and instructions 330-367 shown in FIG. 3B can include or be included in monitoring and scheduling logic 208 shown in FIG. 2A.

Hardware processor 302 may execute instruction 308 to monitor received frames. The frames can be received from STAs. Monitoring received frames can include extracting information from the frames. These frames could have been unsolicited or solicited frames (e.g. as shown in FIG. 2B). These received frames could be in the UL direction. Received frames can be received by SU and/or by MU means. As noted above, the received frames can comprise BSR information, for example the (reported) size of a UL buffer. Received frames can include the following frames: SU UL QoS Null frames, subsequent QoS data or QoS Null frames received as part of UL-OFDMA transmissions, and UL SU QoS data frames. As previously noted, the BSR information can be included as part of the QoS control field of the 802.11 MAC header. As previously described, the AP, (e.g. AP 200 by monitoring and scheduling logic 208) can monitor received frames to determine the reported frames (e.g. bytes thereof) in the UL buffer and/or sent frames (e.g. sent bytes). Thus, the instruction 308 for monitoring received frames can include determining the pending frames or bytes at the buffer of each STA (i.e. reported frames or bytes less frames or bytes that were actually transmitted).

It can be understood that execution of instruction 308 can include initializing one or more parameters to begin monitoring traffic from STAs. It can be understood that received frames can be monitored to determine wither queued UL data/frames fall into specific ACs (e.g. the BE and/or BK ACs).

Hardware processor 302 may execute instruction 310 to determine if a flow (e.g. a new flow) has been detected (e.g. started). Hardware processor 302 may execute instruction 310 to determine if a new STA is detected. Instruction 310 can be executed to determine if a flow has terminated (i.e. relative to a flow that has already started). If the flow is determined to have terminated, hardware processor 302 can revert to executing instruction 308 to continuing to monitor received frames.

It can be understood that the instructions 308-316 can "start" with instruction 306 for monitoring received frames. However, it can also be understood that instruction 310 can also be executed any time (for example, the traffic monitor can determine when flows start or end, etc.) Thus, it is understood that instructions 308-316 could also "start" with instruction 310 for detecting a traffic flow.

Hardware processor 302 can execute instruction 312 to determine the STA priority. The STA priority can be determined for a flow (e.g. if a new flow was started, as detected by execution of instruction 310). The STA priority can be determined by means discussed in relation to FIG. 2A-2B. It can be understood that the prioritization of traffic, may depend on internal software/hardware implementation aspects/characteristics that can impact or change the scheduling of traffic. That is, by analyzing the metadata, AP implementations can determine those traffic flows which correspond to a high-priority (e.g. higher priority channel access). The STA priority can be determined for each STA that has started a flow. As previously discussed, the priority does not necessarily correspond to an advertised priority. The priority can be based on the highest priority for all of the flows from a STA, for example. Accordingly, hardware processor 302 may execute instruction 312 to determine if a latency-sensitive or high-priority flow is detected. In example implementations, if either an end or a start of a STA's high priority or latency-sensitive flow is detected (e.g. at execution of instruction 310 and/or instruction 312), the priority of that STA can be recomputed (e.g. at execution of instruction 312).

Hardware processor 302 may execute instruction 314 to define one or more thresholds. Thresholds (e.g. values of, number of, or types thereof) can be defined based on the determined STA priority (e.g. at execution of instruction 312). The thresholds discussed with reference to FIG. 2C, such as low and/or higher thresholds, can be example thresholds representative of this instruction. It is understood that threshold values (e.g. lower threshold and/or higher threshold) for comparing pending frames for each STA can updated based on this latest priority for the STA (e.g. at execution of instruction 316). It should be understood that by adjusting one or more thresholds for comparing pending frames based on priority can allow for more opportunity to low latency flows (i.e., traffic belonging/corresponding to the VO/VI ACs) to transmit queued data. For example, increasing the lower threshold for comparing pending frames (e.g. as shown with respect to FIG. 2C) to can allow for the scheduler to adjust BSRP for more pending bytes (e.g. for bytes below that increased lower threshold).

In some embodiments, instructions 308-316 are associated with monitored traffic (e.g. data/frames) and can thus be performed by traffic monitor component of monitoring and scheduling logic 208. It can be understood that instructions 308-316 can be performed after the transmission of a BSRP trigger. It can be understood that execution of instructions 308-316 can allow for an AP to dynamically adjust BSRP frequency and/or BSRP interval. Hardware processor 302 can execute instruction 316 to update the scheduler (e.g. UL scheduler). As previously discussed, scheduler can be component of monitoring and scheduling logic 208. The UL scheduler can schedule one or more traffic from STAs, and/or change allocated channel resources for STAs. The scheduler can schedule and/or transmit BSRP triggers (e.g. by DL scheduler for triggers in the DL). Thus, executing instruction 316 can provide to the scheduler one or more information from monitored frames. For example, this can include providing to the scheduler a monitored frame or other information determined from the monitored frame (e.g. at execution of instruction 308), the detected flow (e.g. at execution of instruction 310), the determined STA priority (e.g. as determined at execution of instruction 312), and/or the defined thresholds (e.g. as defined at execution of instruction 316). Executing instruction 316 can also include providing to the scheduler values for one or more parameters to be updated to the scheduler, from example, EDCA or MU EDCA parameters. Executing instruction 316 to update the scheduler can include providing values for the BSRP interval or BSRP frequency, e.g. default value, and/or based on at least one of a monitored frame (e.g. at execution of instruction 308), the detected flow (e.g. at execution of instruction 310), the determined STA priority (e.g. as determined at execution of instruction 312), and/or the defined thresholds (e.g. at execution of instruction 316).

Updating the scheduler based on the determined STA priority, the detected flow, and the monitored received frames, can allow for focusing resources e.g. channel resources for BSRP triggers, on high priority STAs. In embodiments, updating the scheduler can include dynamically updating a BSRP frequency or BSRP interval. In embodiments, by updating the scheduler (i.e. at instruction 316), and by scheduling or generating BSR trigger frame based on the updated scheduler and ultimately transmitting them based on the updated scheduling or generation, STAs can respond with BSR information (e.g. as part of QoS control or BSR control frames). Thus, when the scheduler is updated, it is understood that instruction 308 can be executed again. Instruction 308 can be executed again to monitor new received frames after the updating of scheduler at execution of instruction 316.

FIG. 3B illustrates an example computing component in which the UL scheduler is optimized with self-adjustment BSRP scheme in accordance with various embodiments. Thus, FIG. 3B shows example self-adjustment BSRP scheme, where the BSRP frequency or BSRP interval can be dynamically adjusted. Dynamically adjusting BSRP frequency by a self-adjustment BSRP scheme can allow for the AP to more accurately allocate channel resources or otherwise schedule low latency traffic flows, which can translate into more robust/accurate assessment of flows and adaptation. Processor 302 may execute instructions 330-367 to at least execute instruction 316 shown in FIG. 3A. Processor 302 may execute instruction 330 to calculate received frame (i.e. number and/or bytes thereof) and calculate pending frames (i.e. number and/or bytes thereof). The received and pending frames can be received from and pending at STAs. Received frames can be calculated by monitoring received frames and, for example, incrementing one or more counters corresponding to received frames from specific STAs. The pending frames can be calculated by monitoring received frames, determining advertised or reported pending frames (e.g. by received BSR information), and subtracting the received frames which have been received since the receipt or transmission of the BSR information. Instruction 330 can be executed at or after transmission of a BSRP trigger, for example, which could have prompted receipt of frames comprising BSR information. A BSRP trigger can be transmitted, for example with default values for BSRP frequency or BSRP interval.

As previously discussed, the amount of traffic being transmitted can be compared to the pending traffic and/or the advertised buffer size (i.e. as identified in the BSR information). In embodiments, the amount of traffic being transmitted can be compared to the amount of resources scheduled for that STA. Processor 302 can execute instruction 335 to determine if pending frames (e.g. as determined at execution of instruction 330) are less than or equal to the lower threshold. It is understood that the lower threshold could have been defined or updated, for example as described with reference to instruction 314 shown in FIG. 3A and/or with FIG. 2C.

Instruction 337 can be executed if at execution of instruction 335, the processor 302 determines that pending frames are less than or equal to the lower threshold. Processor 302 can execute instruction 337 to generate and/or schedule a BSRP trigger frame to be transmitted (i.e. immediately or almost immediately). Processor can execute instruction 337 to increase the BSRP frequency (or decrease the BSRP interval). The BSRP frequency can increase by incrementing by some amount (such as by one or two BSRP trigger(s) in a time period). The BSRP frequency can be increased to a level above a default level. The BSRP frequency can increase by decrementing the BSPR interval by some amount (e.g. by 0.1-200 ms).

Hardware processor 302 may execute instruction 340 to determine if pending frames are higher than or equal to a higher threshold. The higher threshold could have been determined or updated for example, as described with reference to instruction 314 shown in FIG. 3B, and/or as shown in FIG. 2C.

The hardware processor 302 can execute instruction 343 if at execution of instruction 340, it is determined that pending frames are higher than or equal to the higher threshold. Executing instruction 343 can include decreasing the BSRP frequency (or increasing the BSRP interval). Executing instruction 343 can include not transmitting a BSRP trigger for a defined interval. Decreasing the BSRP frequency (or increasing the BSRP interval) can include decrementing the BSRP frequency by some amount (such as by one or two BSRP trigger(s) in a time period). The BSRP frequency can be decreased to a level below a default level. The BSRP frequency can decrease by incrementing the BSPR interval by some amount (e.g. by 0.1-200 ms).

AS previously discussed with reference to FIG. 2C, in embodiments, the BSRP frequency or BSRP interval can depend on a trendline or slope in a time series of pending frames. Accordingly, the hardware processor 302 can execute instruction 355 to determine if the pending frames are crossing a lower threshold. Executing instruction 355 can include determining that the pending frames are crossing the lower threshold in the upwards or downwards direction.

If the pending frames are determined to cross the lower threshold at execution of instruction 355, hardware processor can execute instruction 357 to restore the BSRP frequency (e.g. to a prior frequency or to a default frequency) or decrease the BSRP frequency.

For example, If Pending frames(x,t,t1) is increasing (i.e. a positive slope) and crossing the lower threshold in the upward direction (i.e. from below the lower threshold or at the threshold to at the lower threshold or above the lower threshold), the scheduler could either restore BSRP frequency to a default value, restore BSRP frequency to a value it was at before the pending bytes were at or below the lower threshold, or decrease the BSRP frequency.

Similarly, hardware processor can execute instruction 360 for determining that the pending frames are crossing the higher threshold. For example, instruction 260 can be executed to determine that the pending frames are crossing the higher threshold while decreasing (i.e. with a negative slope). Hardware processor can execute instruction 363 if at execution of instruction 360, it is determined that the pending frames are crossing the higher threshold.

Hardware processor 302 can execute instruction 363 for restoring the BSRP frequency or increasing the BSRP frequency. The BSRP frequency can be restored to a default value, or to another value it was previously at (e.g. for that flow at a prior instance in a time series).

In some embodiments, the amount of traffic being transmitted can be less than the pending bytes calculated, or less than the amount of resources allocated to that STA. For example, frequent BSRP triggers could be transmitted (i.e. more frequent than a default level, e.g. in the case that the pending bytes are below a lower threshold), but the STAs may not be sending enough traffic. These STAs can generally called abnormal STAs. For these abnormal STAs, the STA could have provided stale information in the BSR (thus the calculation for pending bytes is not accurate) and/or the STA was misbehaving (e.g. purposely).

Accordingly, to handle and schedule traffic for these abnormal STAs, hardware processor can execute instruction 365 for detecting abnormal STAs. Abnormal STAs can be detected by determining that received frames (e.g. since receipt of the last BSR information) are less than pending frames. Abnormal STAs can be detected by determining that received frames (e.g. since receipt of the last BSR information) are less than prior pending frames (i.e. the pending frames as calculated before transmission of the previous BSRP trigger or before receipt of the most recently received BSR information). As previously discussed, received frames can be determined at execution of instruction 330.

To schedule data for abnormal STAs, the scheduler can adjust at least one of the frequency at which the abnormal STA is scheduled or the amount of channel resources allocated to the STA for transmission.

These abnormal STAs can be handled by changing the frequency by which the STA is scheduled. These abnormal STAs can be handled by not scheduling the abnormal STAs for data transmission as frequently. I.e. the BSRP frequency can remain the same, however the STA can be scheduled to transmit data frames with less frequency. Alternatively, the abnormal STA can be scheduled at the same frequency, but, it can be scheduled to transmit with a minimal channel resource (i.e. smaller channel resource than would have otherwise been allocated for a non-abnormal STA).

It is understood that if the BSRP frequency is dynamically adjusted or if a BSRP is dynamically triggered (e.g. at execution of instructions 337, 343, 357, 363, 367), other instructions (such as instructions 330, 335, 340, 355, 360, 365 shown in FIG. 3B, or instruction 308 or 316 shown in FIG. 3A) can be subsequently executed. Accordingly, hardware processor 302 may return to executing instruction 308. It can also be understood that BSRP triggers can be generated, scheduled, and/or transmitted accordingly to the adjusted BSRP frequency.

Figure 4:
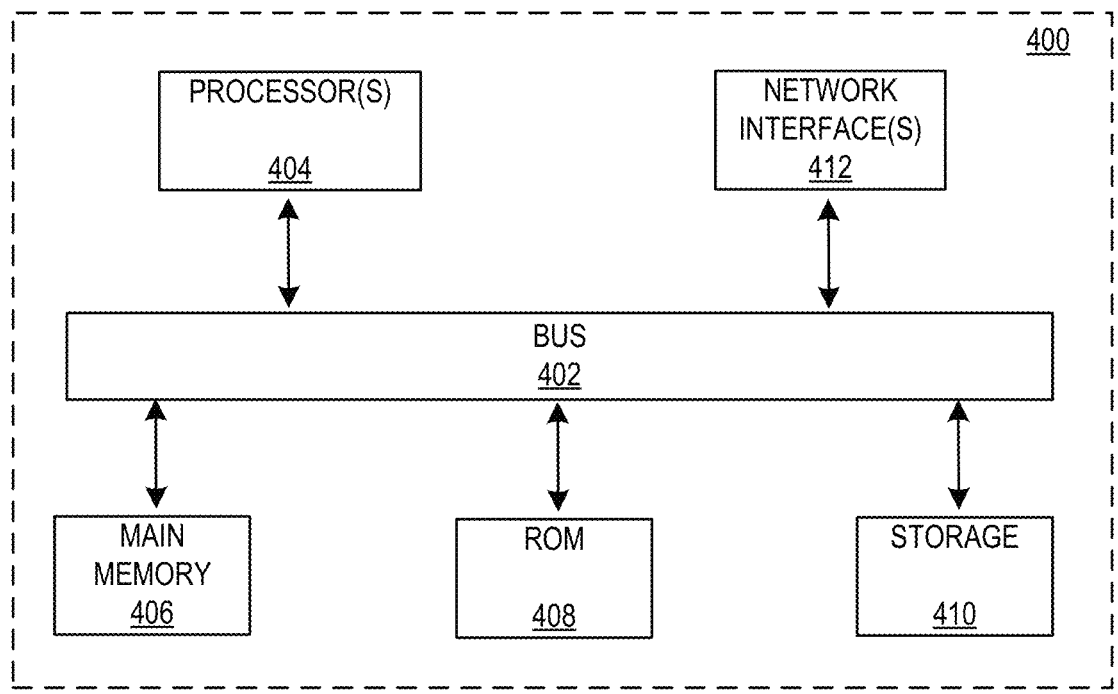
FIG. 4 illustrates an example computing component in which various embodiments described herein may be implemented.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors. Computer system 400 may be an embodiment of an AP controller or AP or similar device.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may further include at least one network interface 412, such as a network interface controller (NIC), network adapter, or the like, or a combination thereof, coupled to bus 402 for connecting computer system 400 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for scheduling uplink (UL) traffic to a wireless local area network (WLAN) device, comprising:
    determining a status of a UL buffer of each station (STA), the status of the UL buffer of each STA comprising an amount of pending data at the UL buffer of each STA; and
    generating and transmitting a buffer state report poll (BSRP) by a UL scheduler of the WLAN device in accordance with a BSRP frequency, the BSRP frequency based on the UL buffer status of each STA.

2. The method of claim 1, wherein the BSRP frequency is based on the number of pending frames at the UL buffer.

3. The method of claim 1, wherein determining the status of the UL buffer of each STA comprises determining a priority of traffic at the UL buffer of each STA.

4. The method of claim 3, wherein determining a priority for the UL buffer of each STA comprises determining the highest priority traffic at the UL buffer of each STA.

5. The method of claim 3, wherein the BSRP frequency is based on comparing the amount of pending data at the UL buffer to a first threshold.

6. The method of claim 5, wherein a value for the first threshold is based on the priority of traffic at the UL buffer of each STA.

7. The method of claim 6, wherein the priority of traffic at the UL buffer of each STA corresponds to the highest priority traffic at the UL buffer of each STA.

8. The method of claim 6, wherein the value of the first threshold has a positive correlation with the priority of the traffic at the UL buffer of each STA.

9. The method of claim 5, wherein if the amount of pending data at the UL buffer of each STA is lower than the value of the first threshold, a value for the BSRP frequency is increased.

10. The method of claim 9, wherein if the amount of data at the UL buffer is determined to be crossing the first threshold in an increasing direction, the BSRP frequency is restored to a default value or decreased.

11. The method of claim 5, wherein the BSRP frequency is based on comparing the amount of pending data at the UL buffer to a second threshold; wherein if the amount of pending data at the UL buffer of each STA is higher than the value of the second threshold, the BSRP frequency is decreased.

12. The method of claim 11, wherein if the amount of data at the UL buffer is determined to be crossing the second threshold in a decreasing direction, the BSRP frequency is restored to a default value or increased.

13. The method of claim 5, wherein if the amount of pending data at the UL buffer of each STA is lower than the value of the first threshold, a BSRP is immediately generated and transmitted.

14. The method of claim 1, wherein the amount of pending data at the UL buffer of each STA is determined by subtracting the amount of received data from the STA since the receipt of a BSR from the STA, from a reported buffer size, wherein the received BSR from the STA comprises the reported buffer size.

15. The method of claim 13, wherein if an abnormal STA is detected, an STA scheduling frequency is reduced for the abnormal STA, or allocated channel resources are reduced for the abnormal STA.

16. A wireless local area network (WLAN) device operating on a channel in the WLAN, comprising:
a processor; and
a memory operatively connected to the processor, the memory comprising computer code that when executed causes the processor to:
monitor received frames from one or more stations (STAB) associated to the WLAN device;
determine an amount of pending data at the UL buffer of each STA based on the monitored received frames;
determine a priority of each traffic flow based on the monitored received frames;
compare the amount of pending data at the UL buffer of each STA to a respective first threshold; wherein a value of the respective first threshold is based on the determined priority for each traffic flow; and
schedule for transmission a buffer state report poll (BSRP) in accordance with a BSRP frequency; wherein the BSRP frequency is based on the comparison.

17. The WLAN device of claim 16, wherein the computer code that when executed causes the processor to schedule for transmission the BSRP, causes the processor to schedule the BSRP for transmission at a higher BSRP frequency when the amount of pending data at the UL buffer is determined to be lower than the value of the first threshold, than when the amount of pending data at the UL buffer is determined to be greater than the first threshold.

18. The WLAN device of claim 17, wherein the computer code that when executed causes the processor to compare the amount of pending data at the UL buffer of each STA to a respective first threshold, causes the processor to determine a slope for the amount of pending data in a time series of pending data; and the computer code that when executed causes the processor to schedule for transmission the BSRP, causes the processor to schedule the BSRP for transmission with lower BSRP frequency if the amount of pending data at the UL buffer crosses the first threshold with a positive slope, than the BSRP frequency when the amount of pending data at the UL buffer is determined to be lower than the value of the first threshold.

19. The WLAN device of claim 16, wherein the computer code that when executed causes the processor to compare the amount of pending data at the UL buffer of each STA to a respective first threshold, causes the processor to further compare the amount of pending data at the UL buffer of each STA to a respective second threshold; wherein the value of the respective second threshold is based on the determined priority for each traffic flow; and the computer code that when executed causes the processor to schedule for transmission the BSRP, causes the processor to schedule the BSRP for transmission with lower BSRP frequency if the amount of pending data is determined to be higher than the second threshold than the BSRP frequency when the amount of pending data at the UL buffer is determined to be lower than the value of the second threshold.

20. The WLAN device of claim 19, wherein the computer code that when executed causes the processor to compare the amount of pending data at the UL buffer of each STA to a respective first threshold, causes the processor to determine a slope for the amount of pending data in a time series of pending data; and the computer code that when executed causes the processor to schedule for transmission the BSRP, causes the processor to schedule the BSRP for transmission with higher BSRP frequency if the amount of pending data at the UL buffer crosses the first threshold with a negative slope, than the BSRP frequency when the amount of pending data at the UL buffer is determined to be higher than the value of the second threshold.

* * * * *